(12) United States Patent
Amir et al.

(10) Patent No.: US 10,789,829 B2
(45) Date of Patent: Sep. 29, 2020

(54) HUB DEVICE

(71) Applicant: Essence Smartcare Ltd., Herzlia Pituach (IL)

(72) Inventors: Ohad Amir, Herzlia (IL); Barak Katz, Petach Tikva (IL); Koby Ben Shloosh, Petah-Tikva (IL)

(73) Assignee: Essence Smartcare Ltd., Herzlia Pituach (IL)

(*) Notice: Subject to any disclaimer, the term of this patent is extended or adjusted under 35 U.S.C. 154(b) by 0 days.

(21) Appl. No.: 16/367,335

(22) Filed: Mar. 28, 2019

(65) Prior Publication Data

US 2019/0304288 A1   Oct. 3, 2019

Related U.S. Application Data

(60) Provisional application No. 62/649,661, filed on Mar. 29, 2018.

(51) Int. Cl.
| | |
|---|---|
| *G08B 1/08* | (2006.01) |
| *G08B 25/00* | (2006.01) |
| *H04B 7/06* | (2006.01) |
| *H04L 29/06* | (2006.01) |

(Continued)

(52) U.S. Cl.
CPC ......... *G08B 25/007* (2013.01); *G08B 25/003* (2013.01); *G08B 25/004* (2013.01); *H04B 1/406* (2013.01); *H04B 7/0602* (2013.01); *H04B 7/15557* (2013.01); *H04L 69/18* (2013.01)

(58) Field of Classification Search
CPC .. G08B 25/007; G08B 25/004; G08B 25/003; G08B 21/02; G08B 25/016; G08B 21/0461; G08B 21/043; G08B 21/0446; G08B 21/0453; G08B 21/18; G08B 25/00; G08B 25/009; G08B 25/014; H04B 1/406; H04B 7/15557; H04B 7/0602;

(Continued)

(56) References Cited

U.S. PATENT DOCUMENTS

2005/0170776 A1   8/2005   Siorpaes
2007/0188390 A1*  8/2007   Dunn ................... H04B 7/0602
                                                         343/702

(Continued)

OTHER PUBLICATIONS

European Search Report dated Jun. 27, 2019 From the European Patent Office Re. Application No. 19165835.0. (6 Pages).

(Continued)

*Primary Examiner* — Anh V La

(57) ABSTRACT

A hub device is disclosed comprising a first antenna communicating with a peripheral device, a second antenna communicating with a remote station. In a first operation mode, transmission by the first antenna is at a first bit rate. Operation may be triggered to switch to a second mode in which a stream of data is received from the remote station, and there is a transmission to the first peripheral device, of data derived from the data stream, the transmission being from the first antenna while the stream of data is being received on the second antenna. In the second mode, the transmission from the first antenna is at a second bit rate that is faster than the first bit rate such that transmitting the derived data at the second bit rate uses a shorter duty cycle than required to transmit the derived data at the first bit rate.

20 Claims, 3 Drawing Sheets

(51) Int. Cl.
*H04B 7/155* (2006.01)
*H04B 1/403* (2015.01)

(58) Field of Classification Search
CPC .................. H04L 69/18; A61B 5/1118; A61B 2562/0257; A61B 5/1117; A61B 2503/08
USPC .......... 340/539.1, 573.1, 573.4, 574, 539.12, 340/539.13, 539.17, 539.11, 539.21, 340/539.23
See application file for complete search history.

(56) References Cited

U.S. PATENT DOCUMENTS

| | | | | |
|---|---|---|---|---|
| 2007/0249307 A1* | 10/2007 | Rybicki | ............... | H04B 7/0837 455/137 |
| 2015/0207536 A1* | 7/2015 | Yehezkely | ............. | H03H 11/02 455/78 |
| 2016/0127972 A1* | 5/2016 | Ananthanarayanan | ....................... | H04W 36/30 370/332 |

OTHER PUBLICATIONS

Ida et al. "Realizing Safe and Reliable Vital Sings Monitoring With Wireless Body Area Networks", 2013 IEEE Region 10 Humanitarian Technology Conference, HTC 2013, Sendai, Japan, Aug. 26-29, 2013, XP002791779, p. 330-335, Aug. 26, 2013.

Yang et al. "Interference Mitigation for Body Area Networks", 2011 IEEE 22nd International Symposium on Personal, Indoor and Mobile Radio Communications, PIMCR 2011, Toronto, ON, Canada, Sep. 11-14, 2011, XP032102305, p. 2193-2197, Sep. 11, 2011.

Climax Technology "Call Point CP-23—Help is Merely a Button Press Away!", Climax Technology, Brochure, Dec. 13, 2012.

Climax Technology "GSM and DECT Emergency Call Box CTC-1016—Establishing a Multi-Person Communications System to Care for All", Vesta Family, Climax Technology, Brochure, Sep. 14, 2013.

Climax Technology "Voice Satellite CTC-808RV—Extending Protection Areas and Caring for Various Family Members Simultaneously", Climax Technology, Brochure, May 29, 2013.

Climax Technology "WTRVS—Voice Reach Talking Pendant", Climax Technology, Product News, Apr. 18, 2017.

* cited by examiner

HUB DEVICE

RELATED APPLICATION(S)

This application claims the benefit of priority under 35 USC § 119(e) of U.S. Provisional Patent Application No. 62/649,661 filed on Mar. 29, 2018, the contents of which are incorporated by reference as if fully set forth herein in their entirety.

TECHNICAL FIELD

The present invention relates to hub devices for one or more peripheral devices. Some embodiments of the invention relate more specifically to hub devices in the form of control panels that wirelessly interface with peripheral devices such as, but not limited to, monitoring devices.

BACKGROUND

Monitoring systems with a hub (e.g. a control panel) and plurality of peripheral devices may be installed in an environment to provide security, surveillance and/or to assist living in the environment. The hub may use a first wirelessly communication channel to a remote station to provide information such as alerts and monitoring and status notifications to the remote station and to receive operational commands or other inputs from the remote station. The hub may use to information received from the remote station, or derived in another manner, to communicate control or other data to/from the peripheral devices via a second wireless communication channel. However, if the second communication channel is in-band or marginally out-of-band with respect to the first communication channel, there may be interference between the two communication channels if the hub attempts to communicate on both channels at the same time. A signal transmitted from the hub's transmitter, via one antenna, may swamp a much smaller signal the hub's receiver is attempting to receive via another antenna, and/or may jam the receiver.

Further, such monitoring systems may have one or more peripheral devices spaced relatively distantly from the control panel. It can be a challenge to provide a communication means that has sufficient range to cover the spacing. Furthermore, transmitting with a further range may increase the interference upon the receiver.

The present invention addresses at least one of these and/or other problems of the prior art.

SUMMARY OF THE INVENTION

A first aspect of the present invention provides a hub device for at least one peripheral device, the hub device comprising:

a first antenna module for communication with a first peripheral device;

a second antenna module for communication with a remote station; and a processing system configured to:

operate in a first mode in which transmission by the first antenna module is at a first bit rate;

upon receiving a predefined trigger, switch operation to a second mode, wherein in the second mode, the processing system is configured to:

receive a stream of data from the remote station; and instruct transmission to the first peripheral device of data derived from the data stream, the instructed transmission being from the first antenna module while the stream of data is being received on the second antenna module; and wherein in the second mode, the transmission from the first antenna module is at a second bit rate that is faster than the first bit rate such that transmitting the derived data at the second bit rate uses a shorter duty cycle than a duty cycle required to transmit the derived data at the first bit rate.

In some embodiments, the first antenna module and the second antenna module interface with a first transceiver and a second transceiver, respectively. In some embodiments, the first antenna module comprises one antenna for transmitting at the first bit rate and another transmitter for transmitting at the second bit rate. In other embodiments, the first antenna module comprises one or more antennas, wherein each of the one or more antennas is configured for alternatingly transmitting at both the first bit rate and at the second bit rate. For example, a first antenna may be used for transmission when in the first mode and also for transmission when in the second mode. However, for convenience hereinafter the first antenna module and the second antenna module will be referred to as the first antenna and the second antenna respectively.

In the embodiments described herein the term "bit rate" refers to the bit rate during transmission of at least part of a message (a message, being for example, a physical layer packet). Thus, the "bit rate", as used herein may be the bit rate of a plurality of bits that make up each data packet, in some embodiments, or a part of each data pack (e.g. a payload or frame), in some embodiments. It will be appreciated, however, that other definitions of "bit rate" may be used without departing from the scope of the invention, as would be understood by a person skilled in the art.

In the embodiments described herein the proportion of time in which one or more messages are transmitted by a transmitter during a transmission cycle is defined as the duty cycle of the transmitter.

Reducing the duty cycle of transmission from the first antenna may result in a smaller percentage of time in which the reception, at said second antenna, of the stream of data from the remote station is swamped by an interfering reception of the transmission from the first antenna, and/or in which the second antenna is jammed by the transmission from the first antenna. However, a lower bit rate supports a longer transmission range, since each bit is transmitted for a longer time. To transmit the same number of bits at a lower bit rate will mean a longer-duration packet and therefore a higher duty cycle. Bearing this in mind, by decreasing the duty cycle during the second mode of operation, the stream of data may be better received at the first antenna, whereas the lower bit rate in the first mode of operation supports a longer transmission range for the first mode of operation.

In some embodiments, the derived data is transmitted from the first antenna as a plurality of data packets at a predefined periodicity, wherein each data packet has a predefined duration of transmission. In some embodiments, the faster bit rate of the second mode is selected such that the duration of transmission of each packet is less than a maximum duration at which a mobile communication protocol used for transmission of the stream of data has packet error rate sufficiently low for a human to be unable to detect the packet errors. For example, or in any case, the packet error rate is less than 5%, or in some embodiments, less than 2%, or in some embodiments, less than 1%. In some embodiments, the faster bit rate is sufficiently fast for the mobile communication protocol to compensate for errors in packets that are caused by the transmission from the first antenna.

In some embodiments, transmission from the first antenna is in a first radio frequency (RF) band, and reception on the second antenna is in a second RF band, wherein the first RF band is at least one of in-band and marginally out-of-band (or at least part of the first RF band is in-band) with respect to the second RF band.

In some embodiments, the duty cycle required to transmit the derived data at the first bit rate is less than 100%. Despite the duty cycle having a value less than 100%, and the processing system thus being able to transmit all of said derived data, shortening the duty cycle to lower than said value may improve an ability to communicate data from the remote station to the hub device when the data is included in said stream of data when the processing system is operating in the second mode. In some cases, the un-shortened duty cycle (i.e. said duty cycle required to transmit the derived data at the first bit rate) is between about 10% and about 30%, such as 19.9% in some embodiments or 27.5% in some other embodiments.

In some embodiments, the data stream is an audio stream from a voice call, wherein in the second mode the device acts as a voice extender by extending the received audio stream to the first peripheral device. In some embodiments, the audio stream has a required bandwidth of 325 kHz. In some embodiments, the audio stream has a required bandwidth of 311 kHz. In some embodiments, the audio stream from the remote station consists is received in packets having a duration of 20 ms. In some embodiments, the 20 ms packets have are transmitted with a periodicity of 20 ms. This may be the case, for example, in 3G communication.

In some embodiments, at an upper end of a first bit rate range, the first bit rate is less than 120 kbits/s. In some embodiments the first bit rate is less than 80 kbits/s. In some embodiments the first bit rate is less than 40 kbits/s.

In some embodiments, at a lower end of the bit rate range, the first bit rate is greater than 5 kbits/s. In some embodiments the first bit rate is specifically, greater than 20 kbits/s. In some embodiments the first bit rate is specifically, greater than 35 kbits/s.

In some embodiments, more specifically, the first bit rate is within range between 30 and 50 kbits/s, or in some embodiments between 35 and 40 kbits/s. In some embodiments the first bit rate is more specifically 38.4 kbits/s, or about 38.4 kbits/s. In some other embodiments, however, the first bit rate is more specifically 9.6 kbits/s, or about 9.6 kbits/s.

In some embodiments, on a lower end of a second bit rate range, the second bit rate is greater than 120 kbits/s. In some embodiments the second bit rate is specifically, greater than 150 kbits/s. In some embodiments the second bit rate is specifically, greater than 200 kbits/s.

In some embodiments the second bit rate is specifically between 150 and 300 kbits/s. In some embodiments, more specifically, the second bit rate is within range between 200 and 250 kbits/s, or in some embodiments, more specifically, between 220 and 240 kbits/s. In some embodiments the second bit rate is more specifically 230 kbits/s, or about 230 kbits/s.

In some embodiments, the second bit rate is more than twice the first bit rate. In some embodiments, the second bit rate is more than four times the first bit rate. In some embodiments, the second bit rate is six times, or about six times, the first bit rate. In other embodiments, the second bit rate is between 24 times, or about 24 times, the first bit rate.

In some embodiments, the second bit rate and a duration of each of the packets is selected so that, for each of the data packets, a duration of transmitting the data packet is less than 10 milliseconds, or in some embodiments, less than 5 milliseconds, or in some embodiments, less than 2 milliseconds, or in some embodiments, between 1.5 and 2 milliseconds, or in some embodiments, 1.8 milliseconds.

For example, in the case of 1.8 milliseconds, the size of the data packet may be 53 bytes and the second bit rate may be 38.4 kbits/s.

Further the data packets may be transmitted with a periodicity of 40 milliseconds. Thus, for example in the case of the duration of transmission being 1.8 milliseconds, the shorter duty cycle of the second made may be 4.6%.

In any case, the shorter duty cycle is, in some embodiments, less than 10%, or in some embodiments, less than 8%, or in some embodiments, less than 5%.

However, decreasing the duty cycle by too much reduces the range of transmission for a transmission at the same power. Therefore in some embodiments in which the power of the transmission from the first antenna is important, the duty cycle is, although shortened, kept above 1%, or in some embodiments, above 2% or in some embodiments, above 3% or in some embodiments, above 4%.

In some embodiments, the data stream comprises video stream. This may be addition to or as an alternative to audio data.

In some embodiments the stream of data is communicated over a mobile network link using a spread spectrum protocol. For example, in some embodiments the telecommunications link is a 3rd Generation (3G) Global Systems Network (GSM) link. In other embodiments the telecommunications is a $4^{th}$ Generation (4G) mobile telecommunications link, for example a Long Term Evolution (LTE) link.

In some embodiments, the first RF band is marginally out of band with respect to the second RF band by having there being a band gap between the first RF band and the second RF band that is, in some embodiments less than 10%, or in some embodiments less 5%, or in some embodiments less than 3%, or in some embodiments 2.5%, of a closest cutoff frequency of the second RF band to the first RF band. For example, the case of 2.5% corresponds, in one or more embodiments in which the first RF band spans between 916.46 and 916.54 MHz and the closest cutoff frequency of the second RF band to the first RF band is 894 MHz.

In some embodiments, such as applicable in the United States of America, the first RF band is within the US 900 MHz ISM band, that ISM band being 902 MHz and 928 MHz. The second RF band in such embodiments may be an RF band used by a mobile network link for the US. For example, in the case of 3G and 4G communication in the United States of America, the second RF band has an upper limit of 894 MHz.

In some embodiments, such as applicable in the Europe, the first RF band is within the European 860 MHz ISM band, that ISM band being 863 MHz and 876 MHz. The second RF band in such embodiments may be an RF band used by a mobile network link for the Europe. For example, in the case of 3G and 4G communication in Europe, the second RF band has a lower cutoff limit of 925 MHz.

In some embodiments the first RF band is narrower than the second RF band. In some embodiments the first RF band is narrower than the second RF band by a factor greater than 10, or in some embodiments greater 100, or in some cases more specifically by a factor between 200 and 300, and in some embodiments by a factor of 250.

Each of the exemplary numbers stated in the various embodiments described above and elsewhere herein, may in particular, by applied to systems for threat detection, especially in a home.

In some embodiments, in the first mode, the hub is configured to at least one of control and monitor the first peripheral device.

In some embodiments, in the first mode, the hub is also configured to at least one of control and monitor one or more further peripheral devices over wireless RF communication in the first frequency band from the first antenna at the first bit rate.

In some embodiment the hub device is a control panel for a plurality of peripheral devices.

In some embodiments, the peripheral devices include a plurality of passive infrared sensors.

In some embodiments, the first peripheral device includes a processing system having at least one threat detection input and upon receiving an indication of safety threat on the at least one threat detection input, the processing system is configured to transmit an alert message for receipt by the hub device on the first antenna when the device hub is operating in the first mode.

In some embodiment, the at least one threat detection input includes one or more of: audio input; a panic button input; a pull chord input; a fall detection input; and an input from remote panic button.

In some embodiments, upon receiving an indication of a safety threat, whether via the first antenna or via another input on the hub device, the processing system of the hub device is configured to transmit a message to the remote station to indicate the safety threat.

In some embodiments, the predefined trigger is at least one of:
the processing system of the hub device receiving the indication of the safety threat; or the processing system receiving a request, from the remote station, to operate in the second mode.

The first antenna may be one or a plurality of antennas for collectively communicating with the first device. The second antenna may be one or a plurality of antennas for collectively communicating with the remote device.

In some embodiments the data derived from the stream of data is derived by compressing the received stream of data.

The processing system may be further to configured to, upon receiving a further trigger, switch to a third mode of operation in which the processing system receives a further stream of data, which in some embodiments is at the second bit rate, from the first peripheral device and while receiving the further stream of data transmits data derived from the further stream of data to the remote device. The second and third mode may be jointly used to support, for example, a two-way communication (e.g. voice) extension path through the hub device.

In a second aspect of the present invention there is provided a system comprising the hub of the first aspect of the present invention and the at least one peripheral device, wherein the at least one peripheral device includes at least said first peripheral device. In some embodiments the at least one peripheral device also includes one or more other peripheral devices described herein. For example, it may include a second peripheral device having the same capabilities of said first peripheral device. In such embodiments, the hub may, in some embodiments, be configured to receive a selection selecting one of the first and second peripheral devices, wherein said first peripheral device, to which transmission of the derived data is instructed, is the selected one of the first and second peripheral devices. The selection may, for example, be received by receiving said, or another, indication of a safety threat from the first peripheral device.

In other embodiments, the selection may be received on the second antenna, from the remote station.

The one or more other peripheral devices may, in some embodiments, additionally or alternatively include one or more passive infrared detectors.

A third aspect of the present invention provides a non-transient computer readable medium that stores code for execution by a processing system on a device having a first antenna for communication with a first peripheral device and having a second antenna for communication with a remote station, wherein upon executing the code the processing system is configured to:

operate in a first mode in which transmission by the first antenna is at a first bit rate;

upon receiving a predefined trigger, switch operation to a second mode, wherein in the second mode, the processing system is configured to:

receive a stream of data from the remote station; and instruct transmission to the first peripheral device of data derived from the data stream, the instructed transmission being from the first antenna while the stream of data is being received on the second antenna; and wherein in the second mode, the transmission from the first antenna is at a second bit rate that is faster than the first bit rate such that transmitting the derived data at the second bit rate uses a shorter duty cycle than a duty cycle required to transmit the derived data at the first bit rate.

In some embodiments the device is the hub device of the first aspect of the present invention.

A fourth aspect of the present invention provides a method of operating a device having a processing system, a first antenna for communication with a first peripheral device, and a second antenna for communication with a remote station, the method comprising:

operating the device in a first mode in which transmission by the first antenna is at a first bit rate;

upon receiving a predefined trigger, switching operation of the device to a second mode, wherein in the second mode, a processing system in the device is configured to:

receive a stream of data from the remote station; and instruct transmission to the first peripheral device of data derived from the data stream, the instructed transmission being from the first antenna while the stream of data is being received on the second antenna; and wherein in the second mode, the transmission from the first antenna is at a second bit rate that is faster than the first bit rate such that transmitting the derived data at the second bit rate uses a shorter duty cycle than a duty cycle required to transmit the derived data at the first bit rate.

In some embodiments the device is the hub device of the first aspect of the present invention.

As used herein, except where the context requires otherwise, the terms "comprises", "includes", "has", and grammatical variants of these terms, are not intended to be exhaustive. They are intended to allow for the possibility of further additives, components, integers or steps.

Various embodiments of the invention are set out in the claims at the end of this specification. Further aspects of the present invention and further embodiments of the aspects described in the preceding paragraphs will become apparent from the following figures and description, given by way of non-limiting example only. As will be appreciated, other embodiments are also possible and are within the scope of the claims.

DETAILED DESCRIPTION OF THE EMBODIMENTS

Figure 1:
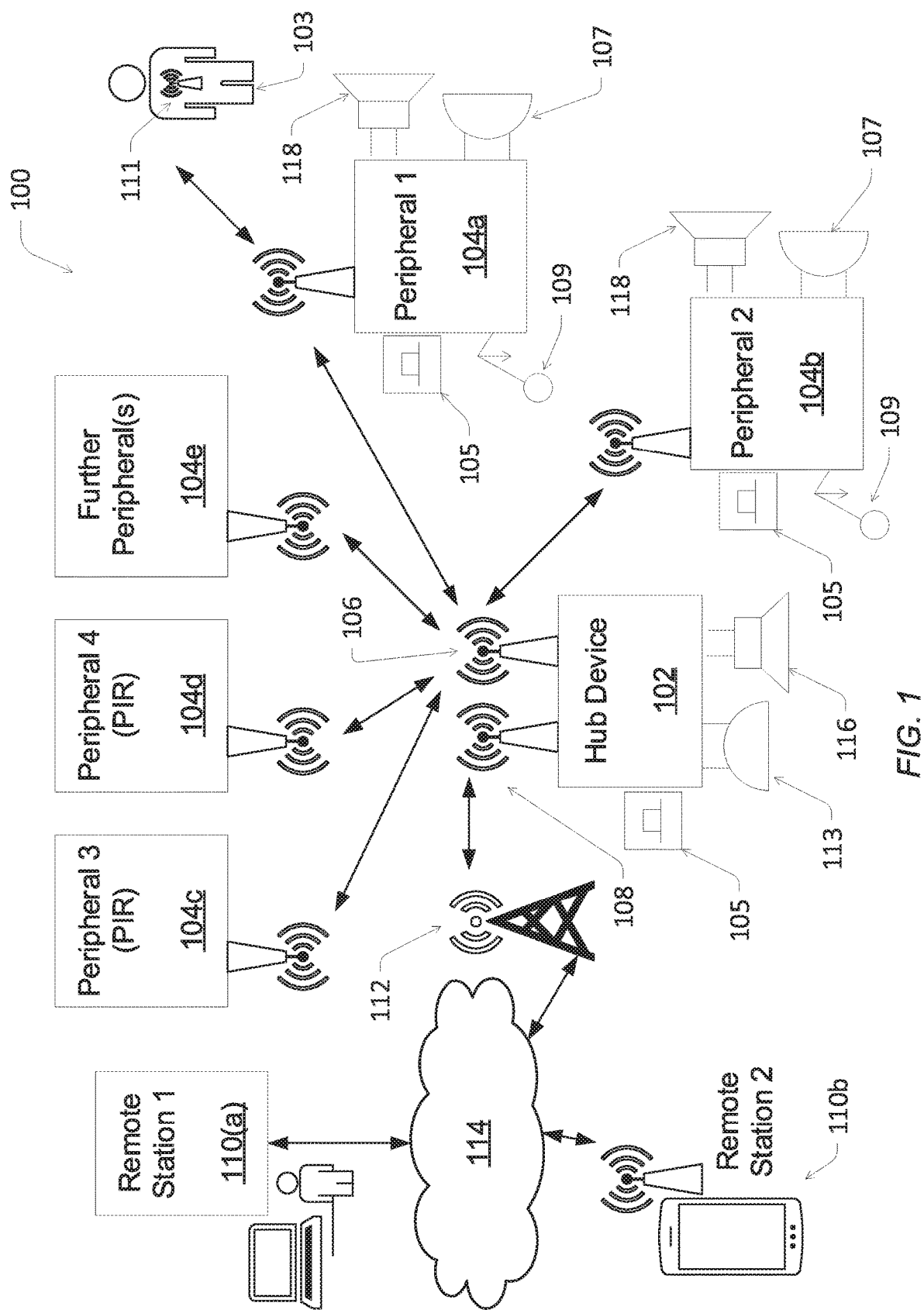
FIG. 1 is a block diagram of an exemplary system in accordance with an aspect of the present invention, the system having a control panel and a plurality of peripheral devices.

An exemplary embodiment of a system 100 in accordance with an aspect of the present invention is illustrated in FIG. 1. The system has a hub device 102 in the form of a control panel that provides central control of, and data collection from, a plurality of peripheral devices 104(a-e) by RF communication, in a first frequency band, using a local-communication antenna 106 on the control panel 102.

The peripheral devices may include passive infrared detectors (PIRs) 104(c,d) for detecting the presence of a person in a corresponding monitored space with the environment, such as in a specific room. Other peripheral devices, such other peripheral device 104e, may be or include, for example, motion sensors, sensors for detecting changes in a state of a door or window, temperature sensors or any other sensor for measuring an environmental condition or an indication relating to a person 103 that may be in the environment. The other peripheral devices may alternatively be any other smart device for assisting living, including a smart TV, one or more lights, an air conditioning or heating system a hi-fi sound-system, and the like.

The person 103 may be someone for whom monitoring is desirable or necessary. For example, the person 103 may be an elderly or infirm person, and the environment in which they are monitored may be a home residence, in which there may rarely, or at least not always, be another person present to see that the person 103 is safe and well.

The system 100 provides an ability for the person 103 to send an alert to a remote station 110(a,b) indicating a threat to their safety, which may be an environmental threat or a threat to their health or mobility. For example each of the control panel 102 and the peripheral devices 104(a,b) may include a panic button 105 and may include a microphone 107, 113 for detecting a spoken call for help or a threat-indicative sound. The peripheral devices 104(a,b) also each include a pull chord 109 which can be used instead of panic button 105 to trigger the sending of an alert. Because of the ability of the exemplified peripheral devices 104(a,b) to trigger an alert by voice or a panic actuator (button or chord) it is convenient to herein refer to the peripheral devices 104(a,b) as voice panic detectors (VPDs). However, it will be appreciate that the peripheral devices 104(a,b) may in other cases take other forms or have additional or alternative functionality to panic detection.

The VPDs 104(a,b) and, in some embodiments the control panel 102, may receive a remotely derived threat indication on the local-communication antenna 106. Such an indication may be from a fall-detection and panic button pendant 111 worn on the person 103, or in the case of the control panel, the remotely derived threat indication may be an indication transmitted by one of the VPDs 104(a,b).

The control panel has a second antenna 108 that is used for RF communication, in a second frequency band, with one or more remote stations 110(a,b), via a telecommunications tower 112 and telecommunications network 114. The remote remoting station may be a Central Monitoring Station (CMS) 110(a) at which one or more people administer surveillance and responses to the surveillance, when necessary. For example, the CMS may be forwarded the indication of safety threat by the control panel 102, and in response a person may dispatch security personnel or an ambulance, depending on data provided with or inherent in the indication. Another remote station may be provided in the form of a personal general computing device 110b, such as a laptop, notebook, desktop, tablet, smartphone or the like. The personal computing device may alternatively be a customized computing device intended specifically for the administration of the system 100. In any case the personal computing device may be operated by a person such as a family member or carer of the person 103.

Advantageously the person at the remote station 110(a,b) is able to talk with the person 103 in need of assistance. To achieve this, the control station 102 may include a speaker 116 which, in conjunction with its microphone 105, enables the control station to act as a 2-way voice-communication device, when needed. The person 103 can thereby talk to the remotely located person via the RF channel on which the antenna 108 operates. However, the person may not always be able to be within close enough range of the control panel to benefit from its microphone 113 and/or speaker 116. For example, the have fallen and not sufficiently mobile to reach the control panel 102 or may be unable to do so quickly. They may, however, be at or near a VPD 107. They may for example have triggered the alert from the VPD, e.g. by pulling its pull chord 109.

To capitalize on this, each VPD may advantageously include a speaker 118 of its own. This, in combination with its microphone 107, the VPD (a,b) may be provided with 2-way voice-communication functionality. In particular, the relevant VPD 104(a,b) may send voice audio to, and receive to voice audio from, the relevant remote station 110(a,b), via control panel 102. In this manner, the control panel 102 acts as a voice extender. In other embodiments other media may be extended instead of or in addition to voice.

Figure 2:
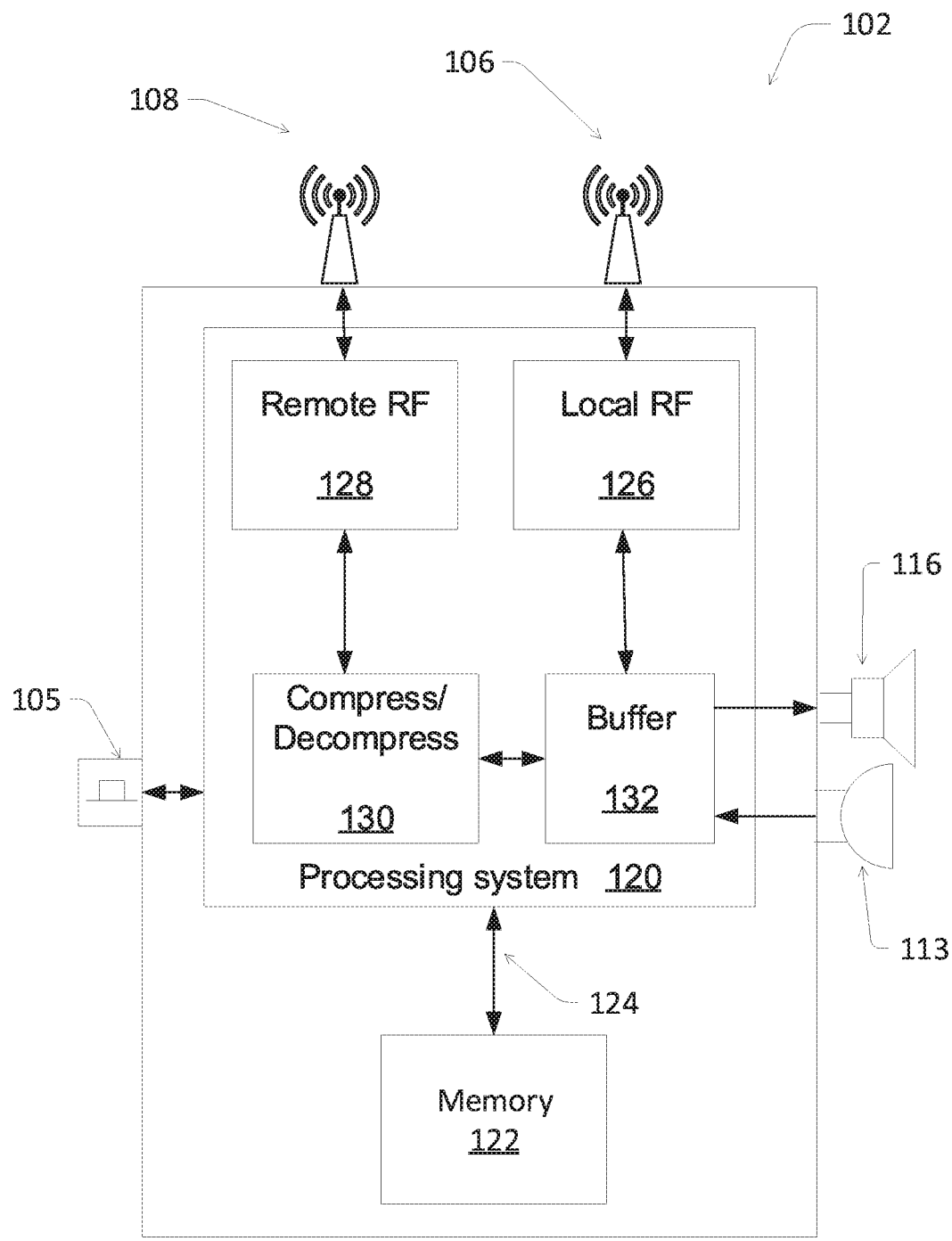
FIG. 2 is a block diagram illustrating hardware components of an exemplary control panel in accordance with FIG. 1 and another aspect of the present invention.

An exemplary hardware topology for the control panel 102 is illustrated conceptually in FIG. 2. The VPD includes a processing system 120, which may be comprised of one or more processing chips. The processing system includes one or more microprocessors, microcontrollers, ASIC chips and the like, and may include a memory. Additionally, or alternatively, it may interface with a separate memory 122 via a bus 124. The memory 122 comprise one or more machine readable storage devices which store instructions and/or data for controlling operation of the processing system 120. In this instance, memory system 122 includes a system memory (e.g. a ROM for a Bios), volatile memory (e.g. a random access memory such as one or more DRAM modules) and non-volatile memory (e.g. Flash memory or other EEPROM device). In a first mode of operation, the processing system 120 receives inputs and processes inputs from the panic button 105 and speaker 113 and/or signals received from one or more peripheral devices 104 via the local-servicing antenna 106 to identify indications of a safety threat. Data received on the local servicing antenna 106 is also used to supervise and/or control each of the peripheral devices 104(a-e) on a communication channel operated by a local RF processing module or chip 126, which operates in a frequency band that is in-band or, in some embodiments, out of band or, in some embodiments, marginally out of band of the communication operated by a second RF processing module or chip 128 for mobile communication using remote communication antenna 108.

The processing system 120 switches to a second mode of operation if triggered to do so, which can occur either automatically upon detecting a safety threat signal, or by a request to enter the second mode that is received from the remote station. In the second mode the control panel acts as a voice extender. As a voice extender, in the downlink direction, a stream of data is received via antenna 108. The received data undergoes compression by a compression component 130 and the voice data derived from the compression component is forwarded to a buffer component 132 to enable the voice data to be transmitted on the local antenna 106 while (at the same time as) the stream of data is received on the mobile network antenna 108. The uplink process is essentially the same as the downlink process but in the reverse direction and the compression component 130 is a decompression component.

A wide variety of frequency ranges may be used for the respective channels, but in some embodiments the channels are both in respective bands that have a lower cutoff frequency above 100 MHz and an upper cutoff frequency below than 2 GHz. For example, in the exemplified embodiment described hereinafter the mobile communication channel is a 3G or 4G channel and/or having a downlink band of 869-894 MHz when operating in the US. The uplink band in such cases is 824-849 MHz. In other embodiments, the mobile communication channel is a 3G or 4G channel and/or having a downlink band of 925-960 MHz when operating in Europe. The uplink band may in such cases be 880-915 MHz. The local RF channel operated on the other antenna 126, on the other hand, may have a band that lies between the US and the European downlink bands.

In the exemplified case discussed herein the local RF channel has a band of 916.46 to 916.54 MHz, and the mobile communication band is the US 3G/4G downlink band of 869-894 MHz. Thus, the local communication band is out-of-band, but only marginally, with respect to the mobile communication band. As a result, there is not enough band gap to isolate the transmission from the local-communication channel antenna from the mobile-communication channel, so the location transmission swamps the mobile signal and/or jams reception on the mobile channel. To address this, the bit rate of the local transmission is increased when in the second mode, so as to reduce the duty cycle of the transmission.

Figure 3:
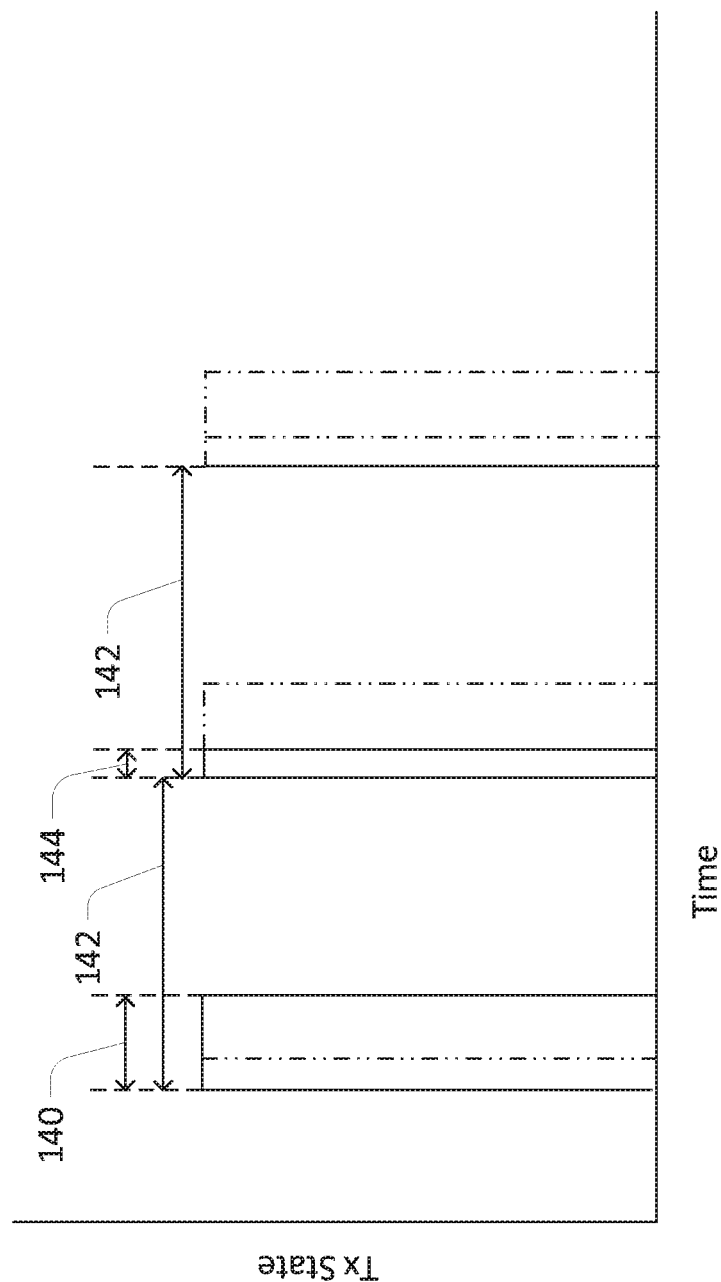
FIG. 3 is a timing diagram showing timing of transmissions from an antenna on the control panel in FIGS. 1 and 2 to a peripheral device of FIG. 1, for different bit rates.

FIG. 3 shows overlaid transmission timing diagrams for transmissions from the local antenna to the given VPD 104(*a,b*), showing a difference in duty cycles resulting from transmitting data packets at a first bit rate compared with a second bit rate that is faster than the first bit rate, in an exemplary embodiment. In this embodiment, the packets are transmitted with a periodicity which defines one transmission cycle 142. In other embodiments, multiple packets may be transmitted within each transmission cycle. In the first mode of operation packets are transmitted at a first bit rate. In the second mode of operation packets are also transmitted at a second bit rate that is faster than the first bit rate. In some embodiments, the packets in the second mode may have a different number of bits as the packets in the first mode, but in other embodiments the packets in the second mode may have the same number of bits as the packets in the first mode. In any case, were the packets in the second mode transmitted with the bit rate of the first mode, the duration of transmission of the data packets would be equal to a first time 140, with a resulting duty cycle equal to the duration 140 divided by the period of the transmission cycle 142. However, in the second mode of operation the data packets are instead transmitted at the second bit rate, which being faster than the first bit rate. This results in the duration of transmission of the data packets being equal to a second time 144 that is shorter than the first time 140, hence also resulting in a shorter duty cycle than the duty cycle required (i.e. that would have been required) to transmit the same data packets at the first bit rate.

With a reduced duty cycle in the voice extension mode, the interference from the first antenna's transmission on reception at the second antenna occurs for a lower percentage of time, thus resulting in fewer error rates in mobile-network voice packets (i.e. transmitted from the cellular communication tower 112 to the control panel 102). Further, in some embodiments, a faster bit rate is selected for the voice extension mode such that the duration of transmission of each packet from the first antenna is less than a maximum duration at which a mobile communication protocol used for transmission of the stream of data has packet error rate sufficiently low for a human to be unable to detect the packet errors. For example, or in any case, the packet error rate is preferably less than 5%, but in some embodiments is more specifically less than 2% or less than 1%. In some embodiments, the faster bit rate is sufficiently fast for the mobile communication protocol to compensate for errors in packets that are caused by the first transmission. In some embodiments, the duty cycle of the transmission of packets from the first antenna is less than 10%. In some embodiments, the duration of each local transmission is selected to be less than the duration of each mobile-network packet, which in some embodiments is 20 ms.

The switching to a higher bit rate for voice-extending mode, as opposed to using the same higher bit rate in the supervisory/control mode, may provide a number of advantages. One advantage arises from there being an inverse relationship between the bit rate and the transmission range. Using a lower bit rate during the supervisory/control mode enables a longer transmission range for the supervisory/control mode. The frequency channel used to communicate between the control panel 102 and each VPD 104(*a,b*) may also be used to communicate between the control panel 102 and the other peripheral devices 104(*c-e*), and those other peripheral devices 104(*c-e*) which are not involved in voice extension may be positioned further away from the control panel 102 than if the higher bit rate were used for their communication with the control panel. Thus, a single transceiver may be used for both (i) voice-extension supported communication to the VPDs (102*a,b*) and (ii) the longer-range communication to the peripheral devices 104(*c-e*) that do not support voice-extension.

Another advantage is that it enables a cheaper transceiver to be used for the local transmission. Regulations in some countries restrict the maximum bandwidth allowable for the supervisory/control mode whereby the cheaper transceivers do not support the higher bit rate while staying within the maximum bandwidth. For example, at 9.6 kbits/s, a relatively cheap transceiver such as Texas Instruments transceiver CC1100, can be used keeping the bandwidth to within a 25 kHz bandwidth limit in Europe for CAT1 use. Yet the same transceiver can be used for voice-extension mode when the CAT1 bandwidth restriction does not apply.

Example

In one example of implementing one or more aspects of the present invention, the mobile communication protocol is a 3G protocol operating in a downlink band of 869-894 MHz, and the local RF channel operates at a center frequency of 916.5 MHz using a lower power RF transceiver operated produced by Texas Instruments, having a part number of CC1100. Each transmission from the local RF transceiver has a power ratio of 14 dBm.

During a supervisory mode of operation, the control panel transmits to the plurality of peripheral devices at a bit rate of 38.4 kbits/s at a bandwidth of 32 kHz.

In the voice-extending mode, the locally transmitted voice packets are 53 bytes, each including a payload of 40 bytes. The periodicity of local packet transmissions is 40 ms.

Were the packets transmitted at 38.4 kbits/s the duration of each packet transmission would be 11 ms, resulting in a duty cycle of 27.5%, jamming the reception of voice packets from the mobile-network. With such jamming all packets of a test sample of 10 packets were unable to be received by the receiver. Thus, during the voice-extending mode, the bit rate is increased to 230 kbits/s, resulting in the duration of each packet transmission being 1.84 ms, a resulting duty cycle of 4.6%. The bandwidth of the transmission at this higher bit rate is 82.5 kHz, thus spanning from about 916.46 MHz to about 916.54 MHz. At the higher bit rate, there was no audibly detectable loss of voice data.

Where a given item is referenced herein with the preposition "a" or "an", it is not intended to exclude the possibility of additional instances of such an item, unless context requires otherwise.

The invention disclosed and defined herein extends to all plausible combinations of two or more of the individual features mentioned or evident from the text or drawings. All of these different combinations constitute various alternative aspects of the invention.

What is claimed is:

1. A hub device for at least one peripheral device, the hub device comprising:
    a first antenna module for communication with a first peripheral device;
a second antenna module for communication with a remote station; and
a processing system configured to:
    operate in a first mode in which transmission by the first antenna module is at a first bit rate;
    upon receiving a predefined trigger, switch operation to a second mode, wherein in the second mode, the processing system is configured to:
    receive a stream of data from the remote station; and
    instruct transmission to the first peripheral device of data derived from the stream of data, the instructed transmission being from the first antenna module while the stream of data is being received on the second antenna module; and
    wherein in the second mode, the transmission from the first antenna module is at a second bit rate that is faster than the first bit rate such that transmitting the derived data at the second bit rate uses a shorter duty cycle than a duty cycle required to transmit the derived data at the first bit rate.

2. The hub device according to claim 1, wherein the derived data is transmitted from the first antenna module as a plurality of data packets at a predefined periodicity, wherein each data packet has a predefined duration of transmission, and the faster bit rate is selected such the duration of transmission of each packet is less than a maximum duration for which the data is received on the second antenna module with a packet error rate of any one of: less than 5%; less than 2%; and less than 1%.

3. The hub device according to claim 1, wherein transmission from the first antenna module is in a first radio frequency (RF) band, and reception on the second antenna module is in a second RF band, wherein the first RF band is at least one of: a) marginally out-of-band and b) at least partly in-band, with respect to the second RF band.

4. The hub device according to claim 1, wherein the stream of data is an audio stream from a voice call, wherein in the second mode the device acts as a voice extender by extending the received audio stream to the first peripheral device.

5. The hub device according to claim 1, wherein the second bit rate and a duration of each of a plurality of data packets is selected so that there is at least one of:
    a) for each of the data packets, a duration of transmitting the data packet is less than 10 milliseconds, each data packet being comprising part of the data derived from the stream of data; and
    b) the shorter duty cycle has a value of less than 10%.

6. The hub device according to claim 1, wherein the stream of data is communicated over a mobile network link using a spread spectrum protocol for a region of use, the second RF band corresponding to said mobile network link and the first RF band being an ISM band for said region.

7. The hub device according to claim 1, wherein in the first mode, the hub is configured to at least one of control and monitor the first peripheral device, and one or more further peripheral devices over wireless RF communication in the first frequency band from the first antenna module at the first bit rate.

8. The hub device according to claim 1, wherein the predefined trigger is at least one of:
    the processing system of the hub device receiving the indication of the safety threat; and
    the processing system receiving a request, from the remote station, to operate in the second mode.

9. A system comprising the hub according to claim 1 and the at least one peripheral device, wherein the at least one peripheral device includes at least said first peripheral device.

10. A system comprising the hub according to claim 9, wherein the first peripheral device is a voice panic detector.

11. A system according to claim 9, wherein the at least one peripheral device further includes the first peripheral device and a second peripheral device, and the hub is configured to receive a selection selecting one of the first and second peripheral devices, wherein said first peripheral device, to which transmission of the derived data is instructed, is the selected one of the first and second peripheral devices.

12. A system according to claim 11, wherein the selection is based on receiving an indication of a safety threat from the first peripheral device.

13. A non-transient computer readable medium that stores code for execution by a processing system on a device having a first antenna module for communication with a first peripheral device and having a second antenna module for communication with a remote station, wherein upon executing the code the processing system is configured to:
    operate in a first mode in which transmission by the first antenna module is at a first bit rate;
    upon receiving a predefined trigger, switch operation to a second mode, wherein in the second mode, the processing system is configured to:
    receive a stream of data from the remote station; and
    instruct transmission to the first peripheral device of data derived from the stream of data, the instructed transmission being from the first antenna module while the stream of data is being received on the second antenna module; and wherein in the second mode, the transmission from the first antenna module is at a second bit rate that is faster than the first bit rate such that transmitting the derived data at the second bit rate uses a shorter duty cycle than a duty cycle required to transmit the derived data at the first bit rate.

14. A non-transient computer readable medium according to claim 13, wherein by reading said code the processing system causes:

the derived data to be transmitted from the first antenna module as a plurality of data packets at a predefined periodicity, wherein each data packet has a predefined duration of transmission, and the faster bit rate to be selected such the duration of transmission of each packet is less than a maximum duration for which the data is received on the second antenna module with a packet error rate of any one of: less than 5%; less than 2%; and less than 1%.

15. A non-transient computer readable medium according to claim 13, wherein transmission from the first antenna module is in a first radio frequency (RF) band, and reception on the second antenna module is in a second RF band, wherein the first RF band is at least one of: a) marginally out-of-band and b) at least partly in-band, with respect to the second RF band.

16. A non-transient computer readable medium according to claim 13, wherein the stream of data is an audio stream from a voice call, wherein in the second mode the device acts as a voice extender by extending the received audio stream to the first peripheral device.

17. A non-transient computer readable medium according to claim 13, wherein the second bit rate and a duration of each of a plurality of data packets is selected so that there is at least one of:

a) for each of the data packets, a duration of transmitting the data packet is less than 10 milliseconds, each data packet being comprising part of the data derived from the stream of data; and b) the shorter duty cycle has a value of less than 10%.

18. A non-transient computer readable medium according to claim 13, wherein the stream of data is communicated over a mobile network link using a spread spectrum protocol for a region of use, the second RF band corresponding to said mobile network link and the first RF band being an ISM band for said region.

19. A non-transient computer readable medium according to claim 13, wherein upon executing of the code by the processing system:

in the first mode, the hub is configured to at least one of control and monitor the first peripheral device, and one or more further peripheral devices over wireless RF communication in the first frequency band from the first antenna module at the first bit rate.

20. A computer-implemented method of operating a device having a processing system, a first antenna module for communication with a first peripheral device, and a second antenna module for communication with a remote station, the method comprising:

transmitting instructions for operating a processing system of the device in a first mode in which transmission by the first antenna module is at a first bit rate;

in the processing system, upon receiving a predefined trigger, switching operation of the processing system of the device to a second mode, wherein in the second mode, the processing system in the device is configured to:

receive a stream of data from the remote station; and instruct transmission to the first peripheral device of data derived from the data stream, the instructed transmission being from the first antenna module while the stream of data is being received on the second antenna module; and wherein in the second mode, the transmission from the first antenna module is at a second bit rate that is faster than the first bit rate such that transmitting the derived data at the second bit rate uses a shorter duty cycle than a duty cycle required to transmit the derived data at the first bit rate.

* * * * *